US009918537B2

(12) United States Patent
Warther

(10) Patent No.: US 9,918,537 B2
(45) Date of Patent: Mar. 20, 2018

(54) SMART DEVICE PROGRAMMABLE ELECTRONIC LUGGAGE TAG AND BAG MOUNTINGS THEREFORE

(71) Applicant: Vanguard Identification Systems, Inc., West Chester, PA (US)

(72) Inventor: Richard O. Warther, West Chester, PA (US)

(73) Assignee: Vanguard Identification Systems, West Chester, PA (US)

( * ) Notice: Subject to any disclaimer, the term of this patent is extended or adjusted under 35 U.S.C. 154(b) by 0 days.

(21) Appl. No.: 14/957,219

(22) Filed: Dec. 2, 2015

(65) Prior Publication Data

US 2016/0183653 A1 Jun. 30, 2016

Related U.S. Application Data

(63) Continuation-in-part of application No. 14/516,204, filed on Oct. 16, 2014, now Pat. No. 9,224,084, which
(Continued)

(51) Int. Cl.
*G06K 19/00* (2006.01)
*A45C 13/42* (2006.01)
(Continued)

(52) U.S. Cl.
CPC ............... *A45C 13/42* (2013.01); *G06F 3/14* (2013.01); *G06K 19/04* (2013.01);
(Continued)

(58) Field of Classification Search
USPC .......... 235/375, 385, 487, 492; 340/10, 572
See application file for complete search history.

(56) References Cited

U.S. PATENT DOCUMENTS 4,861,644 A 8/1989 Young et al.
4,978,146 A 12/1990 Warther et al.
(Continued)

FOREIGN PATENT DOCUMENTS

EP 1870849 A2 12/2007
EP 2431930 A1 3/2012
(Continued)

OTHER PUBLICATIONS

The Future of Electronic Paper. Oct. 15, 2007. 9 pages. http://thefutureofthings.com/articles/1000/the-future-of-electronic-paper.html by The Future of Things.
(Continued)

*Primary Examiner* — Matthew Mikels
(74) *Attorney, Agent, or Firm* — Panitch Schwarze Belisario & Nadel LLP

(57) ABSTRACT

Luggage tag has a body with one bistable electronic visual display assembly and one screen, a radio receiver and a processor configured to convert short range command signals detected by the receiver into signals suitable to modify the image on the display screen. A manually operated switch activates the receiver and processor with a battery for a short time period sufficient to receive the command signals and modify the display. The electric components are encapsulated with an RFID transponder assembly in one resiliently flexible, plastic laminate body or the transponder assembly is encapsulated in a planar, plastic laminate flap permanently attached to a separate rigid protective case housing the remaining electric components. The tag is secured to a bag with a flexible connector, under tension, to retain the tag in a fixed position always exposing the sole display screen.

14 Claims, 12 Drawing Sheets

Related U.S. Application Data is a continuation-in-part of application No. 14/207,836, filed on Mar. 13, 2014, now abandoned, which is a continuation of application No. 13/290,559, filed on Nov. 7, 2011, now abandoned, which is a continuation-in-part of application No. 12/960,941, filed on Dec. 6, 2010, now Pat. No. 8,052,061, which is a continuation-in-part of application No. 12/416,637, filed on Apr. 1, 2009, now Pat. No. 7,845,569, and a continuation-in-part of application No. 29/497,596, filed on Jul. 25, 2014.

(60) Provisional application No. 61/891,666, filed on Oct. 16, 2013, provisional application No. 61/920,574, filed on Dec. 24, 2013, provisional application No. 61/942,917, filed on Feb. 21, 2014, provisional application No. 61/970,137, filed on Mar. 25, 2014, provisional application No. 62/016,874, filed on Jun. 25, 2014, provisional application No. 62/034,563, filed on Aug. 7, 2014, provisional application No. 62/049,032, filed on Sep. 11, 2014, provisional application No. 62/086,483, filed on Dec. 2, 2014.

(51) Int. Cl.
*G08C 17/02* (2006.01)
*G06F 3/14* (2006.01)
*G06K 19/077* (2006.01)
*G06K 19/04* (2006.01)
*G06K 19/06* (2006.01)
*G06K 19/12* (2006.01)
*G06K 19/14* (2006.01)

(52) U.S. Cl.
CPC . *G06K 19/06028* (2013.01); *G06K 19/06187* (2013.01); *G06K 19/07707* (2013.01); *G06K 19/07726* (2013.01); *G06K 19/07749* (2013.01); *G06K 19/12* (2013.01); *G06K 19/14* (2013.01); *G08C 17/02* (2013.01)

(56) References Cited

U.S. PATENT DOCUMENTS

| | | | |
|---|---|---|---|
| 5,233,167 A | 8/1993 | Markman et al. | |
| 5,340,968 A | 8/1994 | Watanabe et al. | |
| 5,366,249 A | 11/1994 | Diemert | |
| 5,478,991 A | 12/1995 | Watanabe et al. | |
| 5,495,981 A | 3/1996 | Warther | |
| 5,581,257 A | 12/1996 | Greene et al. | |
| 5,693,766 A | 12/1997 | Bradbury | |
| 5,743,567 A | 4/1998 | Warther | |
| 5,769,457 A | 6/1998 | Warther | |
| 5,838,253 A | 11/1998 | Wurz et al. | |
| 5,863,076 A | 1/1999 | Warther | |
| 5,912,981 A | 6/1999 | Hansmire et al. | |
| 5,973,600 A | 10/1999 | Mosher, Jr. | |
| 5,979,941 A | 11/1999 | Mosher, Jr. et al. | |
| 6,010,159 A | 1/2000 | Warther | |
| 6,039,356 A | 3/2000 | Warther et al. | |
| 6,050,622 A | 4/2000 | Gustafson | |
| 6,089,611 A | 7/2000 | Blank | |
| 6,290,138 B1 | 9/2001 | Ohno et al. | |
| 6,305,716 B1 | 10/2001 | Warther et al. | |
| 6,325,294 B2 | 12/2001 | Tuttle et al. | |
| 6,484,947 B1 | 11/2002 | Miyata | |
| 6,588,658 B1 | 7/2003 | Blank | |
| 6,693,544 B1 | 2/2004 | Hebbecker | |
| 6,769,718 B1 | 8/2004 | Warther et al. | |
| 6,879,424 B2 | 4/2005 | Vincent et al. | |
| 6,942,155 B1 | 9/2005 | Stewart et al. | |
| 6,994,262 B1 | 2/2006 | Warther | |
| 7,153,620 B2 | 12/2006 | Aylward et al. | |
| 7,193,504 B2 | 3/2007 | Carrender et al. | |
| 7,204,652 B2 | 4/2007 | Warther | |
| 7,225,993 B2 | 6/2007 | Warther | |
| 7,233,250 B2 | 6/2007 | Forster | |
| 7,236,151 B2 | 6/2007 | Doane et al. | |
| 7,377,445 B1 | 5/2008 | Stewart et al. | |
| 7,479,940 B2 | 1/2009 | Marhefka | |
| 7,584,896 B2 | 9/2009 | Warther | |
| 7,845,569 B1 | 12/2010 | Warther et al. | |
| 7,909,955 B2 | 3/2011 | Warther | |
| 8,052,061 B2 | 11/2011 | Warther | |
| 2003/0173408 A1 | 9/2003 | Mosher et al. | |
| 2004/0119593 A1 | 6/2004 | Kuhns | |
| 2005/0108912 A1 | 5/2005 | Bekker | |
| 2006/0032907 A1 | 2/2006 | Zercher | |
| 2006/0124757 A1 | 6/2006 | Warther | |
| 2007/0152826 A1* | 7/2007 | August | A01K 11/004 340/572.1 |
| 2008/0030017 A1 | 2/2008 | Warther | |
| 2008/0099723 A1 | 5/2008 | Nose et al. | |
| 2008/0273023 A1 | 11/2008 | Nose et al. | |
| 2009/0009412 A1 | 1/2009 | Warther | |
| 2009/0040048 A1 | 2/2009 | Locker et al. | |
| 2009/0159712 A1* | 6/2009 | Mullen | G06K 19/06206 235/493 |
| 2010/0065648 A1 | 3/2010 | Warther | |
| 2011/0279242 A1 | 11/2011 | Krawczewicz | |
| 2012/0062367 A1 | 3/2012 | Warther | |
| 2012/0098642 A1 | 4/2012 | Krawczewicz et al. | |
| 2012/0109735 A1 | 5/2012 | Krawczewicz et al. | |
| 2012/0181333 A1 | 7/2012 | Krawczewicz et al. | |
| 2012/0211569 A1 | 8/2012 | Krawczewicz et al. | |
| 2012/0217303 A1 | 8/2012 | Krawczewicz et al. | |
| 2013/0162429 A1 | 6/2013 | Pfuhl | |
| 2014/0191851 A1 | 7/2014 | Warther | |

FOREIGN PATENT DOCUMENTS

| | | | |
|---|---|---|---|
| EP | 2737820 A1 | 6/2014 | |
| GB | 2500054 A | 9/2013 | |
| GB | 2523633 A | 9/2015 | |
| WO | 2006052422 A2 | 5/2006 | |
| WO | 2006122300 A2 | 11/2006 | |
| WO | 2007011514 A2 | 1/2007 | |
| WO | 2011/093780 A1 | 8/2011 | |
| WO | 2012/152745 A1 | 11/2012 | |
| WO | 2013/039395 A1 | 3/2013 | |
| WO | 2014/013439 A1 | 1/2014 | |

OTHER PUBLICATIONS www.ier.fr 2007© Discussion of Air Transportation and baggage handling. 8 pages.
High Definition Printing t™ for Maximum Security Identification Cards. Technology White Paper. 2008. HID Global. 4 pages. www.hidglobal.com.
Alien Company home page discussing Radio Frequency Identification (RFID) products at 2009©.
www.alientechnology.com home page. 2007©.
ISO/IEC; "International Standard—ISO/IEC 7811-2-Identification Cards—Recording Technique", Part 2, Reference No. ISO/IEC 7811-2-1995(E); 17 pages; (Second Edition Aug. 15, 1995); Geneva, Switzerland.
Office Action dated Aug. 8, 2012 in U.S. Appl. No. 11/967,502.
Office Action dated Oct. 3, 2012 in U.S. Appl. No. 13/290,559.
Office Action dated Apr. 11, 2012 in U.S. Appl. No. 13/290,559.
Office Action dated Feb. 21, 2013 in U.S. Appl. No. 13/290,559.
Office Action dated Aug. 19, 2013 in U.S. Appl. No. 13/290,559.
"Near Field Communication," retrieved from the internet at www.wikipedia.com, (Oct. 16, 2012).
The Next Big Thing in Tech? Here are 7 Ideas by John Brandon on Mar. 24, 2014, 3 pages. http://www.inc.com/john-brandon/7-tech-innovations-coming-this-year-or-early-next.html.
"Digital Bag Tags Could Make Paper Luggage Tags Obsolete" by Harriet Baskas on Nov. 13, 2013, 3 pages. http://www.nbcnews.com/travel/digital-bag-tags-could-make-paper-luggage-tags-obsolete-2D11582680.

(56) References Cited

OTHER PUBLICATIONS

Office Action dated Oct. 22, 2014 in U.S. Appl. No. 14/207,836.
Search Report dated Jun. 24, 2015 in GB Application No. GB1423111.2.

* cited by examiner

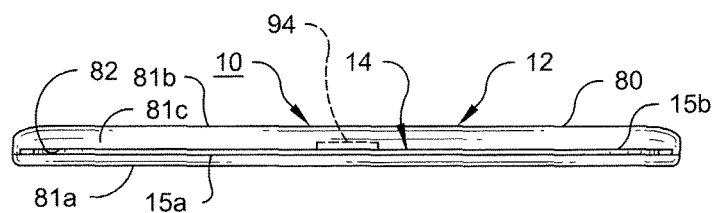
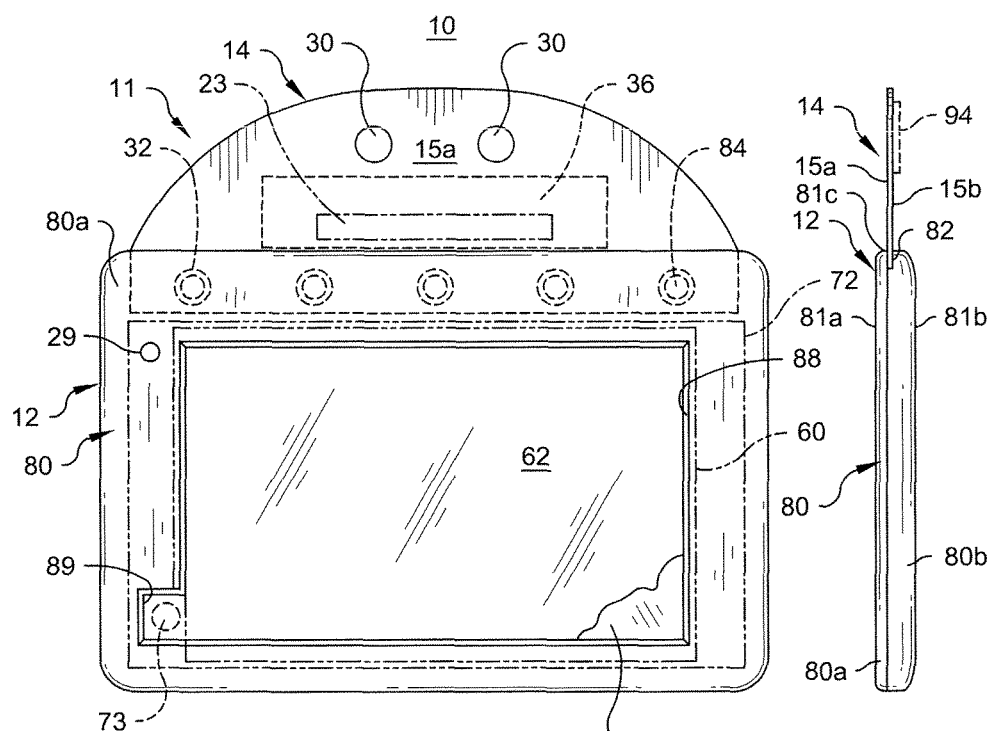
Fig. 2
Fig. 1
Fig. 3

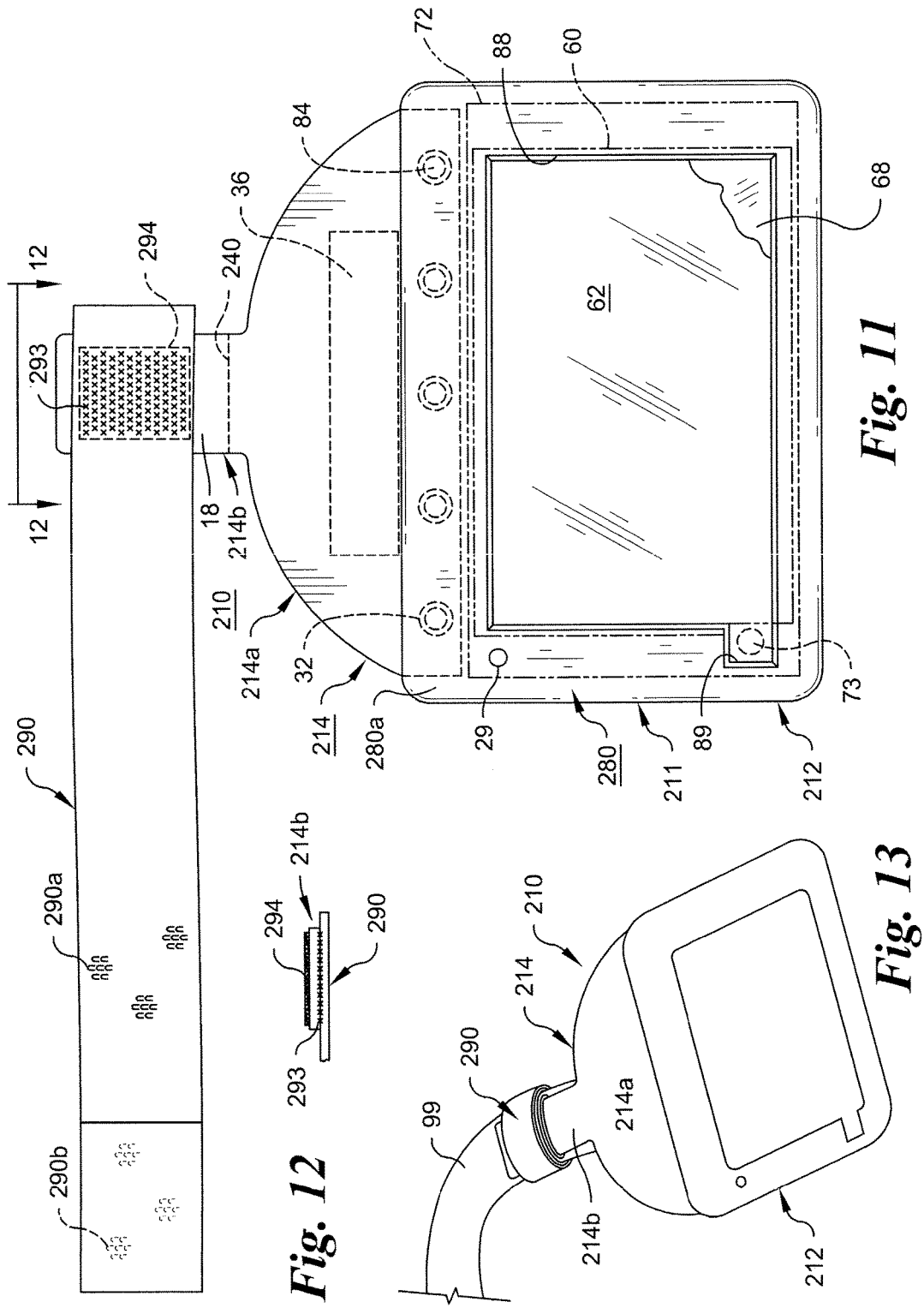

SMART DEVICE PROGRAMMABLE ELECTRONIC LUGGAGE TAG AND BAG MOUNTINGS THEREFORE

CROSS-REFERENCE TO RELATED APPLICATIONS

This application is a Continuation-in-part of U.S. patent application Ser. No. 14/516,204 filed Oct. 16, 2014, which is a Continuation-in-part of U.S. patent application Ser. No. 14/207,836 filed Mar. 13, 2014 and now abandoned, which is a Continuation of Ser. No. 13/290,559 filed Nov. 7, 2011 and now abandoned, which is a Continuation-in-part of Ser. No. 12/960,941 filed Dec. 6, 2010 and now U.S. Pat. No. 8,052,061, which is a Continuation-in-part of Ser. No. 12/416,637 filed Apr. 1, 2009 and now U.S. Pat. No. 7,845,569. It is related to U.S. Patent Application Nos. 61/891,666 filed Oct. 16, 2013, 61/920,574 filed Dec. 24, 2013, 61/942,917 filed Feb. 21, 2014, 61/970,137 filed Mar. 25, 2014, 62/016,874 filed Jun. 25, 2014, 62/034,563 filed Aug. 7, 2014, 62/049,032 filed Sep. 11, 2014, 62/086,483 filed Dec. 2, 2015 and Ser. No. 29/497,596 filed Jul. 25, 2014. All of the above-identified applications are incorporated by reference herein in their entireties.

BACKGROUND OF THE INVENTION

The present invention relates to electronic luggage tags, which are reusable.

Travelers are encouraged to tag their suitcases and other luggage to assist in owner identification. Many travelers use permanent tags with personal information printed or hand written. Some bags are equipped with viewing compartments configured to receive a conventional business card carrying the same information. Virtually all airlines request if not require travelers to mark their bags. Most airlines will even provide travelers with disposable tags on which the traveler can provide personal identification and contact information if the traveler's bags do not include their own tags.

U.S. Pat. No. 8,052,061 discloses several forms of programmable luggage tags with radio frequency transponders. However, these forms of tags have, for various reasons, not been found adequate to meet the needs or desires of the airline industry.

It would be beneficial to provide a permanent luggage tag that could be used repeatedly by travelers and further be capable of integration into carriers' baggage handling/management systems in place of single use, printed airline tags.

BRIEF SUMMARY OF THE INVENTION

In one aspect, the invention is an electronic luggage tag comprising: a body; a bistable electronic visual display assembly in the body and including a display screen visible outside the body; a radio receiver in the body; a processor in the body operably connecting the radio receiver with the display assembly to change an image shown on the display screen in response to external command signals received through the radio receiver; a battery power supply in the body; and a manual input device located on the body for manual actuation and configured to selectively connect the battery power supply with the radio receiver and the processor to activate the radio receiver and the processor to reprogram an image displayed on the display screen in response to external command signals received by the radio receiver.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIGS. 1-3 are front, side and top view, respectively, of a first embodiment luggage tag according to the invention.

FIGS. 11-13 depict a second embodiment tag with second bag attachment.

DETAILED DESCRIPTION OF THE INVENTION

Figure 4:
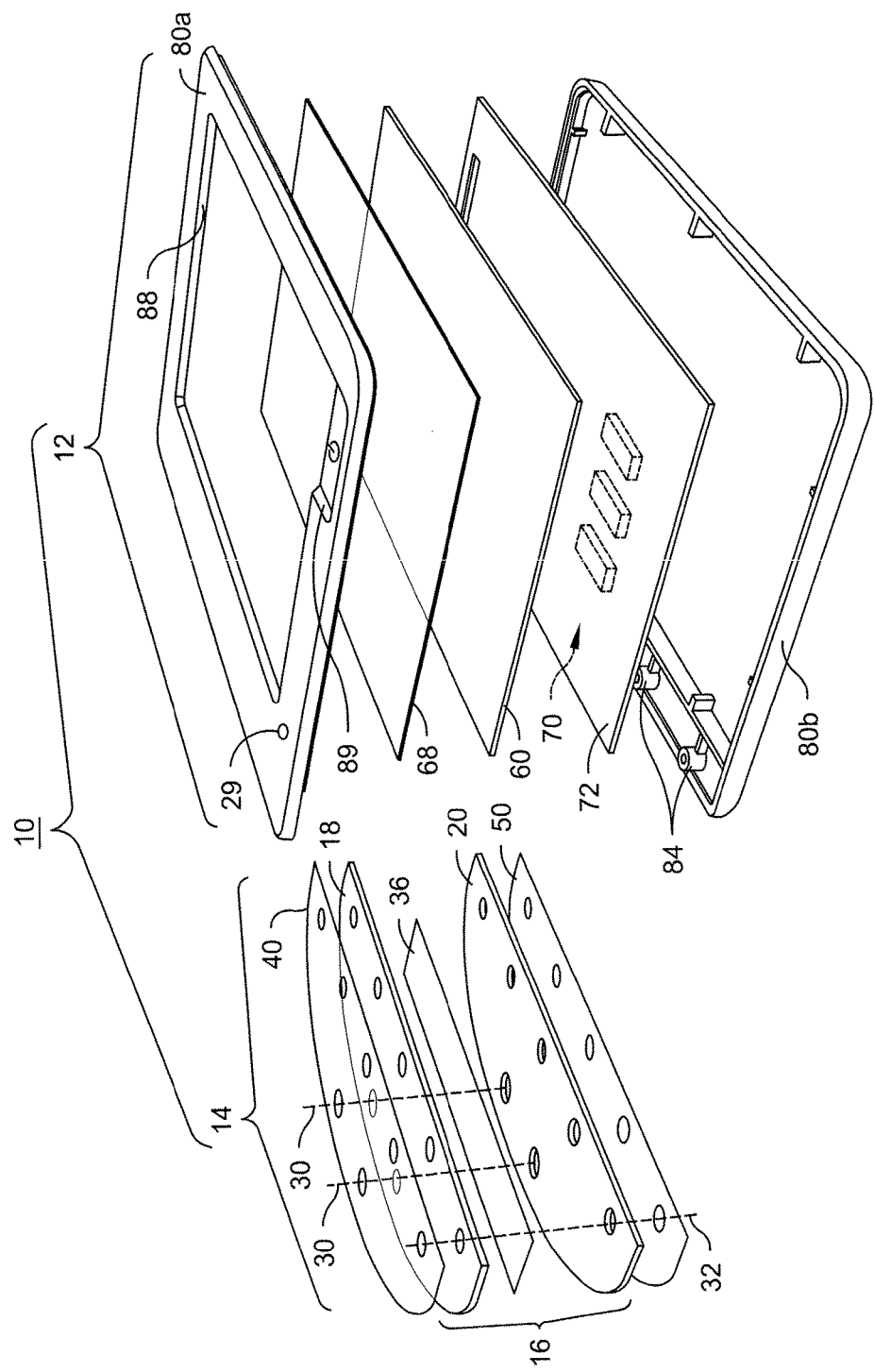
FIG. 4 is a diagrammatic exploded view of the tag of FIGS. 1-3.

Certain terminology is used in the following description for convenience only and is not limiting. The words "right," "left," "lower" and "upper" designate directions with respect to components in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import.

FIGS. 1-4 depict a first exemplary embodiment, smart device programmable luggage tag with RFID transponder assembly and wirelessly reprogrammable electronic visual display according to the present invention and indicated generally at 10. Tag 10 and other tags to be described are "programmable" or "reprogrammable" in the sense that the image presented by visual display can be changed through the provision of appropriate data to control drivers of the display. Tag 10 has a body 11 formed of two distinct parts, a first, "rigid", "hollow" component indicated generally at 12 and a second, resiliently flexible, "solid", planar component or "flap" indicated generally at 14.

The first component 12 is provided by a generally planar, preferably rectilinear polyhedron shaped protective case 80. Case 80 is sufficiently rigid to provide protection to the components it contains from damage due to collisions and other impacts to be expected in normal use. Referring to FIG. 4, case 80 is a multi-piece shell, two pieces 80a, 80b being shown, forming opposing major, preferably planar sides 81a, 81b, respectively, of the case. Preferably the case components 80a, 80b are made of a high impact plastic like high-impact polystyrene (HIPS) or acrylonitrile butadiene styrene (ABS), a metal like aluminum or steel, or a combination of polymer and metal pieces. The first component 12 further includes a programmable, electronic visual display assembly indicated generally at 60 with a display screen 62, and other circuitry indicated generally at 70 on a hidden side of a supporting circuit board 72, which are all received and housed in the hollow case 80. The display screen 62 is visible through a window 88 provided through the first/front shell piece 80a. A recess 87 is provided along an edge of the window 88 for a manually operated input device 73 (in phantom) to activate the tag as will be described. For protection, at least the screen 62 of the display 60 can be covered with a transparent polycarbonate sheet 68 and that sheet provided with an additionally protective and reflection resistant (anti-glare) coating(s) to enhance readability of the display by optical scanners.

Still referring to FIG. 4, the second component or flap 14 of the tag 10 includes a planar sheet core 16, which has planar, opposing, outer major sides 15a, 15b (FIGS. 2 and 3). The core 16 is preferably formed by at least first and second flexible polymer core strips 18, 20, at least one and preferably both of which are of a microporous material like that described in U.S. Pat. No. 4,861,644 and sold commercially by PPG Industries of the U.S. under the mark "Teslin"®. Core strips 18, 20 are permanently bonded together completely around at least one radio frequency identification (RFID) transponder assembly 36, encapsulating and sealing the assembly 36. The assembly 36 is provided by an antenna and circuitry, usually a chip (neither separately depicted). When provided preassembled on a polymer substrate ready for use, it is referred to as an inlay. Preferably, the RFID transponder assembly 36 is configured for ultra-high frequency (UHF) wireless operation and is passive so as to be powered only from an external interrogation signal. At least a first and preferably a second transparent, flexible, nonporous polymer cover strip 40 and 50, respectively, is permanently bonded to the respective exposed front and rear planar, opposing, outer major sides 15a, 15b of the core 16 and core strips 18, 20. The first and second cover strips 40, 50 are suggestedly PE (polyester) film, which provides good strength, wear and soil resistance properties to the outer surface of the flap 14. However, other non-porous polymer sheet materials such as PVC (polyvinyl chloride) or PC (polycarbonate) films may be considered or preferred for other reasons. The various strips 18, 20, 40, 50 are bonded together into a laminate with adhesives suitable for the plastic substrates selected for the strips, preferably UV activated adhesive(s) to avoid exposure of the RFID transponder assembly 36 to undue temperature or pressure. This construction of flexible polymer strips gives the flap 14 the thickness and flexible resilience of a conventional credit or debit card. In contrast to the case 80, the flap 14 will have a stiffness with respect to force applied against either of its major planar surfaces 15a, 15b less than any given stiffness of the case 80 with respect to force applied to its closed major outer side 81b formed by shell piece 80b. The flap 14 will also have a thickness between its opposing major planar sides 15a, 15b less than any given thickness of the case 80 between its opposing major outer sides 81a, 81b.

Referring to FIGS. 2 and 3, as depicted, the flap 14 extends away from one elongated/narrow edge (the "upper" edge) 81c of the case 80 in a direction essentially parallel with the planes of the opposing major outer sides 81a, 81b of the case 80. A slot 82 is provided along the one elongated (top) edge 81c of the case 80 to receive a proximal end portion of the flap 14 and join the flap with the case. The flap 14 is fixedly secured to the case 80 within the case. Preferably, the flap 14 preferably permanently, fixedly secured within the case 80 by mechanical connection(s), weld(s) or adhesive, or with more than one of those connection options. More particularly, in the depicted embodiment, the flap is mechanically captured within the case 80 by a series of hollow posts 84 provided adjoining the slot 82 to be received in a plurality of closed perimeter holes 32 provided through the proximal end portion of the flap 14. Unseen pins on the inner side of the first/top shell half 80a are received in the visible center holes in the posts 84 to align and secure the shell pieces 80a, 80b together. The shell pieces 80a, 80b are preferably joined together with an appropriate polymer adhesive and/or "ultrasonic weld, permanently securing the flap 14 to the case 80. Any remaining open area of the slot 82 where the flap 14 protrudes can be sealed in the same fashion while the window 88 and recess 87 of the case 80 providing visual access to the display screen 62 and access to the manual input device 73 can be sealed by an appropriate polymer adhesive thereby hermetically sealing the display assembly 60 and circuitry 70 within the case 80 and the case 80 with the flap 14. In this configuration, the RFID transponder assembly 36 is located in a portion of the flap 14 physically outside the case 80 and is electrically isolated from the case 80 and its contents. While the flap 14 is preferably secured to the case 80 inside the case, it could alternatively be permanently attached to the outside of the case, for example secured by mechanical fasteners, ultrasonic weld(s) or adhesive to the outer surface 81b of the second/rear shell piece 80b. At least one and preferably a pair of closed perimeter, tag mounting holes 30 are provided, each completely through a distal portion of the flap 14 including the first and second major planar outer sides 15a, 15b of the flap 14, and remote from the case 80, for purposes as will be explained.

Any of the strips 18, 20, 40, 50 might be printed upon before, as a step of or after assembly into the flap 14. The printing can include non-variable images such as logos, trademarks or other source identifiers, use instructions, background graphics, etc. that do not vary from tag to tag in a collection of such tags. The printing might include a unique identification code 23 (in phantom in FIG. 1), for example, a unique identifier like the permanent identification code assigned to the RFID transponder assembly 36 by the inlay or chip manufacturer to uniquely identify the assembly/inlay. That number is loaded into non-volatile memory of the assembly 36, is non-alterable and is transmitted by the assembly 36 in response to an interrogation signal to identify the assembly 36 to the interrogator. The assembly 36 may be programmed to provide additional information pre-stored in the assembly 36 in response to the interrogation signal.

Separating the RFID transponder assembly 36 in the flap 14 from the display 60 and circuitry 70 in the case 80 provides several benefits. It permits the separate manufacture of the second component 14 by conventional, high speed, lower cost, cold lamination and printing processes typically used in credit/debit card and RFID tag and card manufacture. The RFID transponder assembly 36 is encapsulated between the core sheets 18, 20 without being subjected to temperatures and pressures of injection molding processes sometimes used by others to protect an RFID assembly in a hard polymer case. The RFID transponder assembly 36 in this construction is further electrically and functionally isolated from the display 60 and other circuitry 70, including the power supply, as well as any metal in the case 80 to minimize possible interference with the operation of the RFID transponder assembly 36. For example, even if the case 80 were all plastic, many electronic visual display assemblies 60 are provided with a metal backing plate which, if positioned over the assembly 36, could degrade its effective range.

Microvoided/microporous polysilicate sheet material of the type described in detail in U.S. Pat. No. 4,861,644 is relatively very porous with a uniform porosity throughout of greater than thirty percent by volume, more typically forty-five to sixty percent in commercial grades, and an average pore size of about one micron or less. Microvoided/microporous, polysilicate sheet material is suitable for various types of printing including laser printing although other commercially available, printable synthetic paper products might be used as the core strips. It is also waterproof and durable and is sufficiently soft and flexible enough to cushion and thereby protect the RFID transponder assembly 36 it encapsulates from normal impact damage, avoiding the necessity of a protective hard case for the assembly 36. RFID transponder assemblies are sufficiently more robust than are contents of the case 80.

Figure 5:
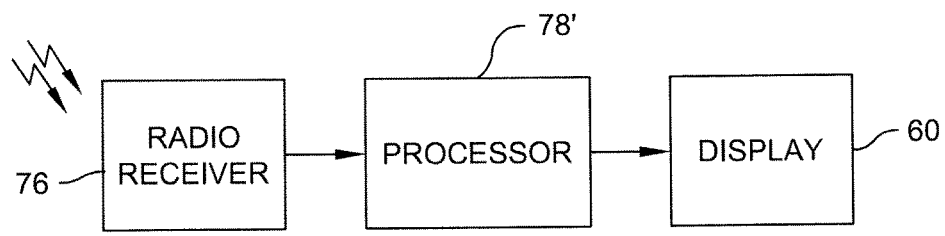
FIG. 5 is a diagrammatic view of the major, connected electrical components of the tag.

The basic operational components of the display portion of the luggage tag 10 are depicted in block diagram form in FIG. 5. They include a wireless radio receiver 76 electrically and operably connected with the electronic visual display assembly 60 through a processor 78'. The wireless receiver identifies wireless command signals and converts them, into a format and structure that can be used by the processor 78'. The processor 78' in turn converts those signals into a format and structure to control operation of the drivers of the display assembly 60.

Figure 10:
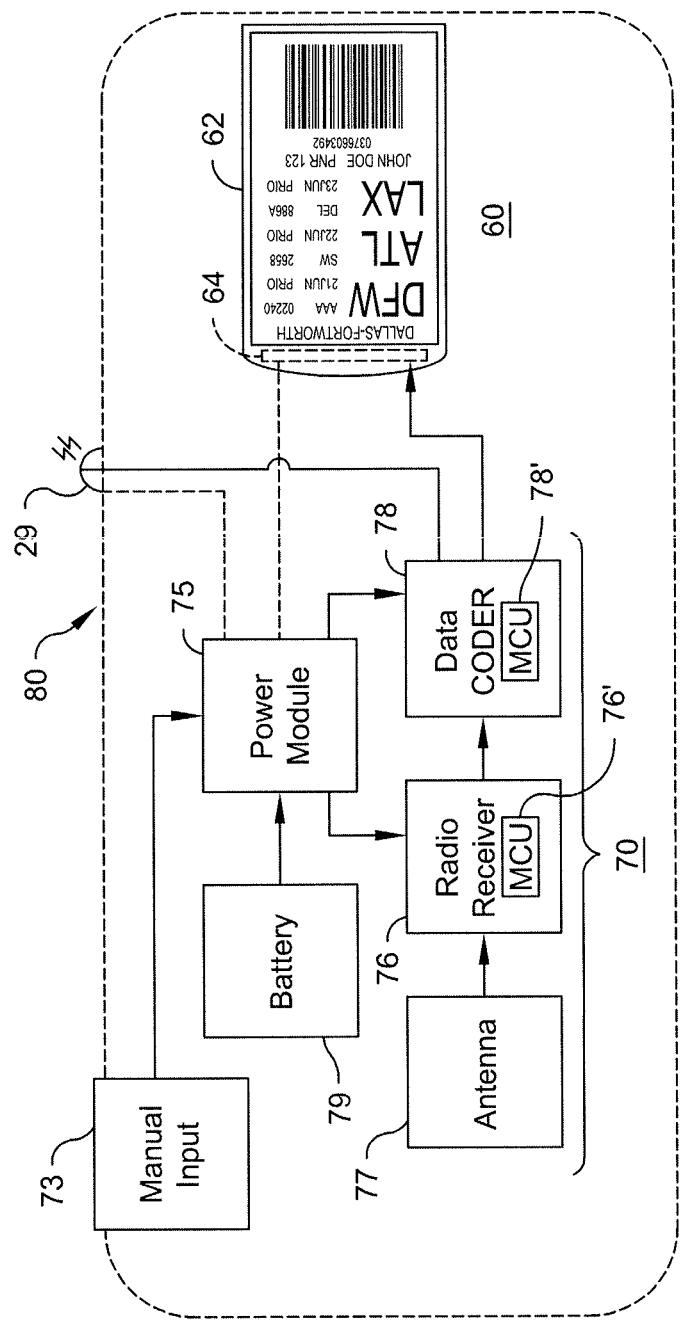
FIG. 10 depicts in block diagram form, one possible configuration of the circuitry associated with the display.

One possible arrangement of the display assembly 60 and other circuitry 70 housed in the case 80 is depicted in a more detailed functional block diagram in FIG. 10. The display assembly 60 includes, in addition to the physical screen 62, driver circuitry 64 which is used to generate the image resident on the screen 62. The manual input device 73 activates the other circuitry 70 in the case 80 for programming/reprogramming the image of the display 60. Device 73 is preferably a mechanical switch that provides tactile feedback to the user but capacitive switches and other types of manually operated switches and other suitable activation devices may be used. Device 73 causes electricity from an on-board battery power supply 79 to pass through a power module 75, which is configured to generate power supplies at appropriate voltages to operate the remaining circuit components and to interface with the driver circuitry 64 of the display 60.

These remaining components includes at least a wireless signal receiver 76 operably connected with an antenna 77. As stated with respect to FIG. 5, the other circuitry 70 includes a processor 78', which in this embodiment is a primary part of a Data Coder 78. Processor 78' controls programming/reprogramming of the display assembly 60. It will further be appreciated that the control function may be provided in a single device/element or divided among several elements, each having its own processor and performing only a limited control function. For example, in FIG. 10, the wireless signal receiver 76 includes its own processor in the form of an "MCU" or "micro control unit" (i.e. a microcontroller including a processor), to identify and convert the wireless/radio image control signals transmitted to the tag 10 to program/reprogram the display on the screen 62 into a format and signal structure that can be used by the next component, a "controller" in the form of a coding engine ("DATA Coder") 78. Coding engine 78 is provided as a separate module operably connected between the wireless signal receiver 76 and the display driver circuitry 64. The coding engine 78 also includes its own processor microcontroller/MCU 78' configured to convert the control signals received from the receiver 76 into command signals with a format, structure and timing suitable to operate the driver circuitry 64 of the display assembly 60 to reprogram the image presented on the screen 62. Alternatively, the receiver 76 and coding engine 78 might be combined in a single module (not depicted) with a single processor performing all the necessary functions between a bare demodulator connected with the antenna 77 and the driver circuitry 64 or the driver circuitry may be "smart", with a processor configured to assume the functions of the coding engine 78, so as to interface directly with the wireless signal receiver 76.

In addition or in the alternative to simply initiating the command signal reception and processing sequence, the input device 73 can be used to signal the circuitry to perform other specific functions. For example, when activating the unit by quick double press of the device 73 (pressing the device for one second, releasing and immediately pressing it again) can signal the data coder 78 to clear the display screen 62. Double pressing while holding device 73 the first time for a longer period (say five seconds) before releasing and repressing can signal the data coder 78 to restore the previously written data. Still other functions can be enabled through depression of the manual input device 73. Timing in this embodiment is handled by the MCU of the data coder 78

Finally, a light source 29 like an LED is preferably provided, visible through the first/front piece 80a of case 80, which is illuminated by processor 78' in this example for a predetermined brief period of time, such as one minute or less, after components of the other circuitry 70 have been activated through manual operation/actuation of the input device 73 to notify the user that the other circuitry 70 is active and will remain active for a period of time (e.g. one minute) awaiting an image control signal from the wireless control signal source (i.e. the smart device). The LED 29 is extinguished when the circuitry 70 goes dormant at the end of the predetermined time period, which again is controlled by processor 78'. It could be replaced or supplemented by another sensory transducer like a sound generator to signal the active period and/or the end of that period. Requiring manual activation of the circuitry 70 and limiting its activation to a reasonably brief period after which it becomes inactive, provides significant protection to the tag 10 from hacking and/or other undesired wireless remote control.

The electronic visual display assembly 60 is preferably a bistable passive reflective display assembly like a sheet of flexible electronic paper ("E-paper" or "e-ink") or one of the newer, "zero power" LCD displays. Truly bistable visual displays require no continuing power to maintain an image. If the display is bistable as preferred, the battery power supply 79 is needed only to power the other circuitry 70 to receive image coding instructions and change the image of the display 60. The bistable display 60, once programmed or reprogrammed, will retain its image without further power usage. Under these conditions, a "coin" type cell battery (not depicted) would be sufficient to power literally thousands of activations and display reprograms. Two such batteries may be provided for redundancy and/or to lengthen the operating life of the tag 10. Alternatively, a rechargeable battery with a wireless charging circuit (not depicted) might be substituted for the non-rechargeable coin battery.

Types of commercially available, bistable displays include: cholesteric liquid crystals (ChLC) on a flexible thin film, electrophoretic, electrowetting and electrofluidic displays using charged pigment particles, water oil mixtures and aqueous pigment dispersions, respectively. A variety of "electronic paper displays" (EPD), extremely thin and flexible, in both active (thin-film-transistor liquid-crystal) and segmented configurations are also commercially available and might be used. This list is suggestive and not intended to be or to be considered to be all inclusive or otherwise exclusive. Moreover, while flexible displays are lighter and thinner, they are more expensive than conventional, rigid (e.g. glass mounted) displays. The rigid protective housing 80 would also permit the safe use of rigid displays, if desired.

Such displays can be programmed/reprogrammed to exhibit conventional luggage tag coded information normally provided by airlines on the paper tags currently used to identify and route passenger luggage. This is itinerary information and a carrier's baggage management system code number, a passenger name record (PNR), a reservation number or other unique record identifier or locator used by the carrier to identify the passenger and itinerary in a central data base used by the carrier. The tag 10 may include other variable data (e.g. passenger name, number of checked bags or items, etc.) that would differ in content from tag to tag of different passengers or even between tags of the same passenger.

Figure 9:
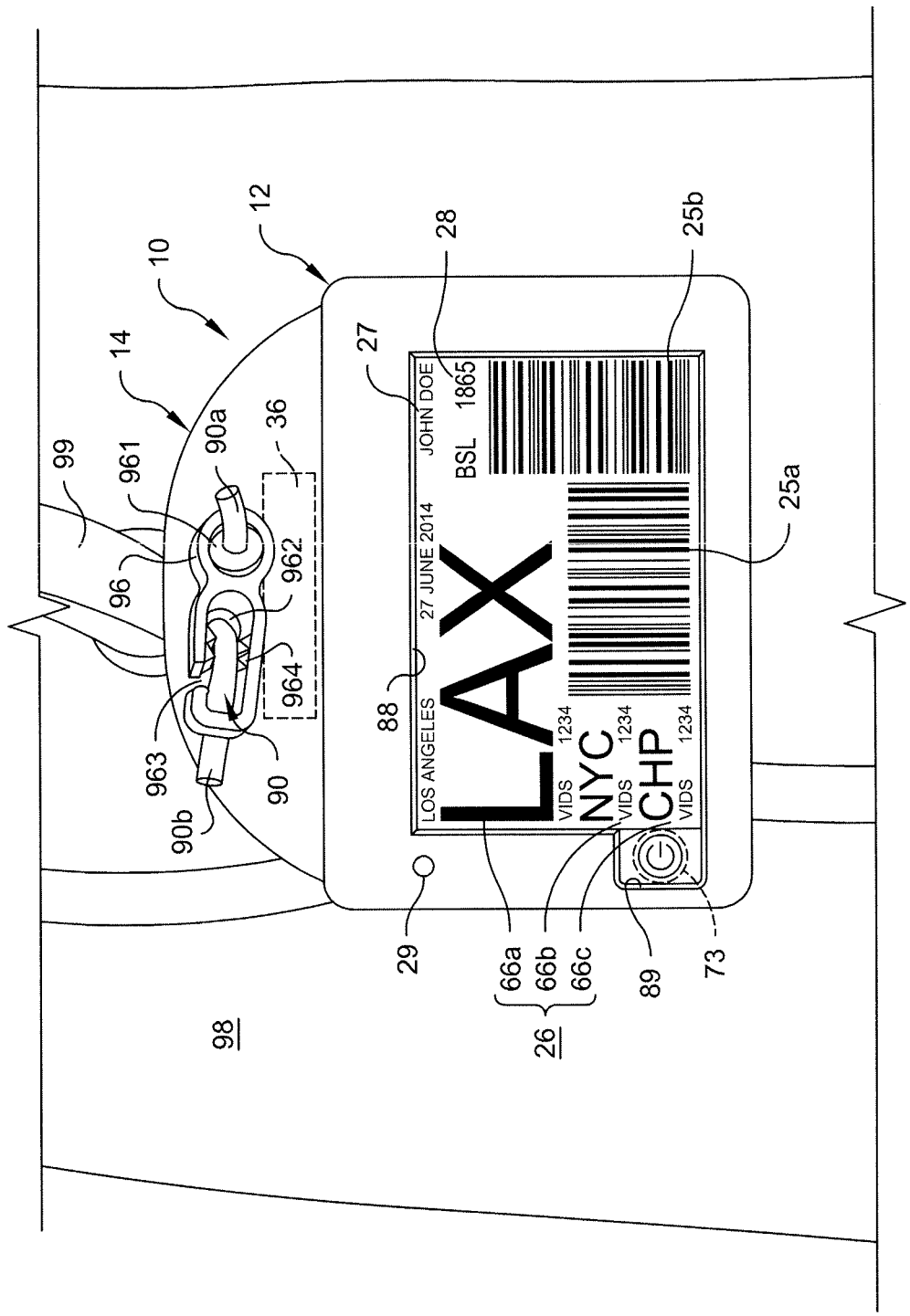
FIG. 9 depicts the first embodiment tag of FIGS. 1-8 secured to a piece of luggage with a first form of bag attachment.

In FIG. 9, two, identical, one-dimensional baggage management system bar codes 25a, 25b are displayed at right angles for use with the optical scanning baggage system equipment conventionally used by airlines. The display on the screen 62 in FIG. 1 further includes, for example, alphanumeric itinerary data indicated generally at 26 and unique identification information such as the user's name 27. Itinerary data 26 include: flight date (27 Jun. 2014); 66a—a destination airport name; 66b—an originating airport, 66c—a connecting or stop-over airport between 66a and 66b. In each instance, the airport abbreviation, the airline abbreviation (VIDS) and flight number (1234) are displayed. With the user's name 27 is a Passenger Reservation number 28 ("BSL 1865"), which is another way to access itinerary and passenger information in a carrier's remote data base.

The wireless image control signal source is a suitably configured and programmed smart device. Currently, smart phones are the wireless control signal sources of choice and Bluetooth Low Energy (BLE) the signal format of choice as virtually all smart phones becoming available are equipped for at least BLE communication. However, other types of "short range" wireless communication formats might be used as an alternative, for example, Near Field Communication (NFC) or conventional or still other Bluetooth formats, and still other short range communication formats that might become available in the future. Radio receiver 76 may be a Bluetooth Low Energy (BLE) or other Bluetooth format or a Near Field Communication format receiver.

It should be appreciated that the tag 10 lacks direct public cellular network and/or internet connectivity capability. All such connectivity of the tag 10 is through a smart phone or other public network connection enabled "smart" device that is also enabled for short range communication with the tag 10. "Long range" communication refers to the normal inherent wireless communication capability provided in cell phones including smart phones to connect with a wireless public cellular communication network. "Long range" also includes other private network communication capabilities that might be provided in a cell phone or smart device such as Motorola MOTO talk, a direct radio communication capability, which has a range in the kilometers. "Short range" communication refers to a separate, additional communication capability and format provided in certain smart phones and other smart devices having wireless public cellular, Wi-Fi and/or WLAN network communication capability. The radio receiver 76 and the processor 78' are configured to handle and process only short range, non-network signal formatting. The radio receiver 76 is the only wireless signal receiver of the tag operably connected with the display assembly 60 for changing the display image. (The RFID transponder assembly has what might be considered a short range, non-network radio receiver but it is not operably connected with the display assembly.) Accordingly the radio receiver 76 and the processor 78' respond only to external, short range, non-network, preferably Bluetooth Low Energy command signals. BLE communications are designed to have a nominal range of about fifty meters, half that of conventional Bluetooth communication. NFC has a nominal range of a fraction of a meter (practical working distance being reported to be about 4 cm or about ⅕ meter). Other short range, non-public, non-network wireless communication protocols and equipment may become widely available in the future to supplant or upgrade Bluetooth, BLE and/or NFC and are intended to be covered by the invention.

In use, an appropriate app would be provided by a carrier or other third party to a passenger to load into the passenger's smart phone or other smart device with public communication network connection capability. When the passenger wanted to program/reprogram the tag 10, the app would be activated in the smart device by the passenger to automatically contact a remote data base designated by the carrier through the app, via a public communication network accessible to the smart device such as a public cellular network or the internet. The app would uniquely identify the passenger to the remote data base. The remote data base would then identify and transfer to the smart phone/device, data from a newly created or previously created itinerary stored in or available to the remote data base. The app would then wirelessly transmit the display data from the smart phone or other smart device in an appropriate, short range format (preferably BLE) to the wireless receiver 76 to update the display 60.

Figure 6:
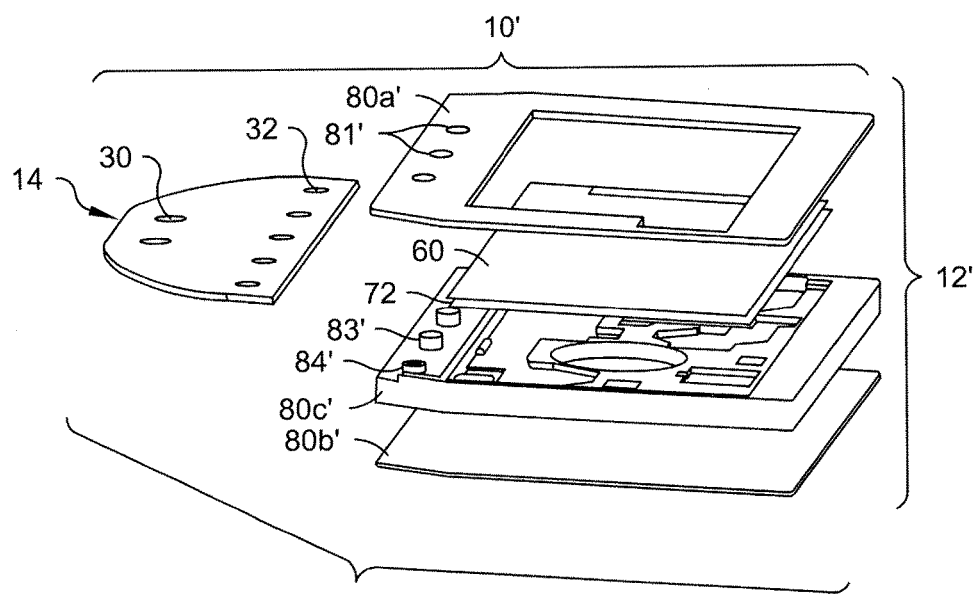
FIGS. 6 and 7 are top and bottom perspective exploded views of an alternate construction of part of the luggage tag embodiment of FIGS. 1-4.
Figure 7:
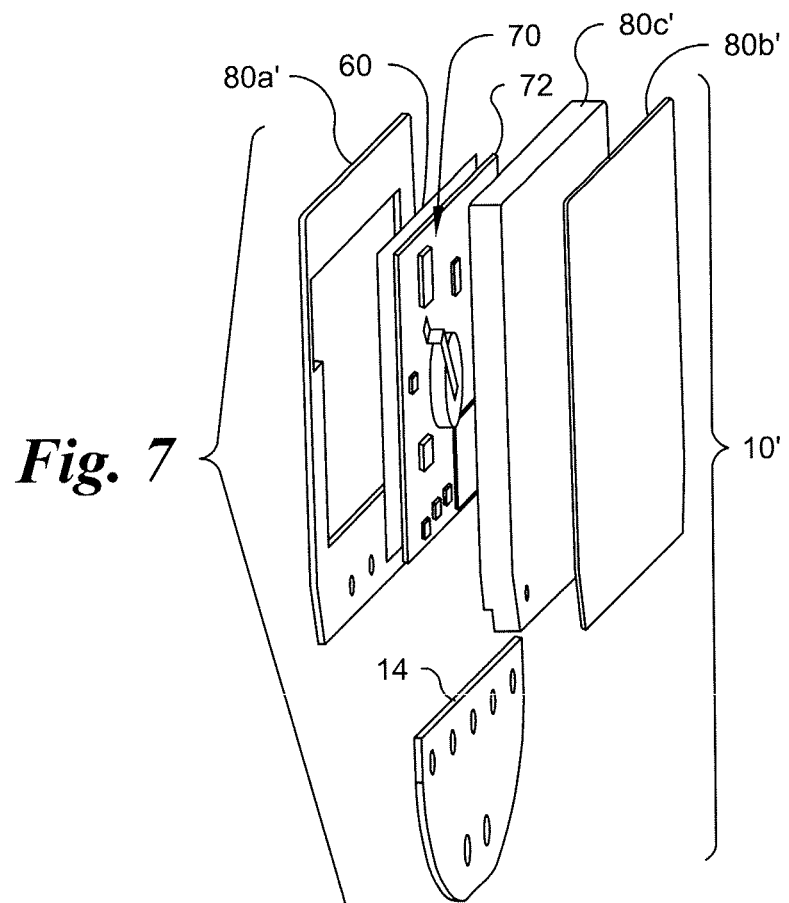
Figure 8:
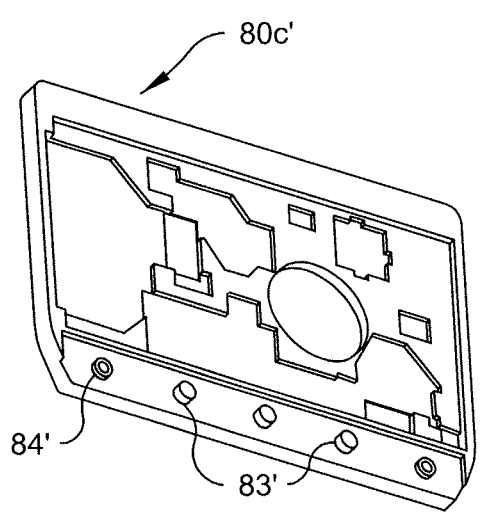
FIG. 8 is a perspective view of the intermediate piece of the revised case configuration of FIGS. 6 and 7.

FIGS. 6-8 depict another smart device programmable electronic luggage tag 10' with body 11'. The only difference between tags 10 and 10' is the construction of the first component 12' case indicated here at 80'. The construction and function of the second component 14 remains the same as does the function and contents of the two first components 12, 12'. Case 80' is a three piece assembly 80a', 80b', 80c' which again receives and houses the programmable, bistable, electronic display assembly 60 and other circuitry indicated generally at 70 on circuit board 72. Front and rear covers 80a' and 80b' are metal, e.g. aluminum or steel, for strength and rigidity. These pieces are flat or substantially flat so that they can be stamped from flat sheet blanks.

The center piece 80c', called a "pillow", is shaped and preferably formed from molded plastic. It is provided with a number of hollow posts 84' and solid pins 83', which are to be received in the openings 22 of the flap 14 to mechanically secure the flap 14 with the hard case 80'. The first/front piece 80a' may be provided with openings 81' to receive one or more of the pins 83', three being shown, for example, to mechanically secure the third piece 80c' with the first 80a'. The pillow 80c' accommodates the circuitry 70 on a facing side of the board 72, which is opposite the side of the board 72 facing the back of the display assembly 60. The pillow 80c' is designed to support the circuit board 72 with a "yin-yang" approach: "valleys" of the pillow 80c' are sized and located to accommodate components of the circuitry 70 protruding from the board 72 thereby providing a protective space around the board mounted components. "Peaks" of the pillow 80c' are provided around and between the valleys and the individual components of the circuitry 70 so as to come into intimate contact with the facing surface of the circuit board 72. Not only does this support the board 72 to limit its flexure, it also supports the back of the display 60, through the board, thereby limiting flexure of the display as well. This is important because it permits the use of a glass mounted display, which is normally susceptible to damage from even modest flexure. Glass mounted displays are several times less expensive than plastic mounted displays of the same design and operational capability. However, prior attempts to incorporate glass mounted displays into luggage tags have met with failure when tested in a typical, luggage handling environment.

Referring to FIGS. 1, 4 and 9, the pair of closed perimeter openings 30 are each provided extending entirely through a distal portion of the flap 14 remote from the case 80, and the major outer sides 15a, 15b of the flap. The holes 30 are located sufficiently close together, suggestedly less than four centimeters apart and preferably only one to two centimeters apart, on center, and located to permit the tag 10 to be tightly strapped to a handle 99 of a bag 98 through the openings 30, without turning movement, in a "license plate" position as depicted. This position enables the tag to be read by conventional airline baggage management/handling system optical scanners as the bag travels conveyors. Being able to maintain the tag in this license plate position eliminates the need for a second programmable display on the second side of the tag to generate another image of a baggage management/handling system bar code as the tag 10, 10' will always be located in a position to read its first/front side display screen 62. By locating the tag 10, 10' on a handle 99 at an edge/end of the bag 98, the tag is also less likely to be damaged by collision during loading and unloading operations. The tag 10, 10' is preferably secured to the handle 99 by an attachment device including a flexible connector 90, preferably provided by a length of elastic shock or "bungee" cord, and a one-piece receiver 96 which receives and secures the ends of the flexible connector 90 to hold the connector 90 under tension while securing the tag to the bag handle 99. The receiver 96 has three side-by side bores: 961, 962 and 963. A first or working end 90b of the connector 90 is passed in one direction through a first bore 961, through one of the closed perimeter openings 30 of the tag 10, around the handle 99, back through the second closed perimeter opening 30 and through a second bore 962 of the receiver 96 adjoining the first bore. Finally the working end 90b is passed through the third bore 963 which, in this example, includes serrations 964 or like mechanical structures that grab and retain the working end 90b of the connector 90 to secure the connector 90 stretched, under tension. Either end of the member 90 might be knotted like end 90a to prevent the end from slipping through its receiving bore. Alternatively, the opposing ends of the connector 90 might be knotted or otherwise secured together, for example with a compression ring or other mechanical fastener (none being depicted). Still other receiver configurations are possible and the invention is not limited to the particular receivers illustrated.

FIGS. 11-13 depict a second embodiment electronic, programmable luggage tag 210 with body 211 and alternative bag securement construction. Body 211 has a first hollow, rigid component 212 with case 280 identical to that 80 or 80' of the first or second embodiment tags 10, 10'. The construction of the second component/planar flap remains the same as flap 14 shown in FIG. 4 although with a different shape and is now indicated as 214. New second component/planar flap 214 is still fixedly connected directly with the first component case 280 in the same way so as to extend outwardly away from the case 280 in a common plane with the case 280. A radio frequency identification transponder assembly 36 (phantom) is still encapsulated between the first and second opposing major planar major sides of the second component/planar flap 214 in a main portion of the second component/planar flap indicated at 214a. The main portion 214a is substantially the same as the entire second component/planar flap 14 of the luggage tags 10, 10' except that the closed perimeter openings 30 may be omitted and the new second component/planar flap 214 includes a tongue 214b, which is integral and coplanar with the main portion 214a and extends away from an edge of the main portion 214a distal to the case 280 in a direction away from the case 280 and the main portion 214a. Suggestedly, the tongue 214b is simply an extension of the main portion 214a with same microporous core strips (18, 20) and optional first and second non-porous cover strips (40, 50).

The bag attachment device of this tag 210 is a flexible connector 290 in the form of a strip of flexible fabric hook 290b and loop 290a fastener material. In tag 210, flexible connector 290 is permanently affixed to the tongue 214b by suitable means such as ultrasonic welding, a permanent adhesive layer (either indicated at 293 in FIG. 12) or even a mechanical fastener like a rivet (not depicted). However, if a first cover strip 40 is again provided on the first/front side of the second component/planar flap 214, it is suggestedly not extended onto the tongue 214b so as to leave a surface portion of the microporous core strip 18 exposed to receive part of the flexible connector 290 of fabric hook and loop fastener material for better ultrasonic welding or adhesive adhesion. A terminal edge of the first cover strip is indicated by phantom line 240. The flexible connector 290 is several centimeters long and of a length sufficient to wrap at least one and preferably more than one full turn completely around a handle 99 of a luggage bag 98 (like FIG. 17) and overlap the hook portion with the loop portion of the flexible connector 290 as depicted in FIG. 13. Flexible connector 290 secures the tag 210 to the handle 99 in the preferred, license plate configuration, whereby the bar codes generated by the display 60 (see FIG. 9) can be read by conventional, airline optical scanning, baggage handling equipment.

To prevent movement of the tag 210 from the preferred, license plate orientation, it is suggested that the flexible connector 290, 290' be somewhat elastic so that it can be more easily secured to itself under tension. However, a non-elastic connector 290, 290' should also be able to be secured with the tag to a bag under tension to maintain the license plate configuration and position. Also, it is suggested that an adhesive layer 294 be provided on a side of the tongue 214b facing the bag handle 99 when the tag 210 is secured to the handle 99. The adhesive is suggestedly pressure sensitive and applied directly to and exposed on the tongue 214b or applied as a piece of double sided tape. An adhesive layer 94 (phantom FIGS. 2, 3) can optionally be applied to the previously indicated flap 14 without tongue or any subsequently described tag embodiments.

Figure 14:
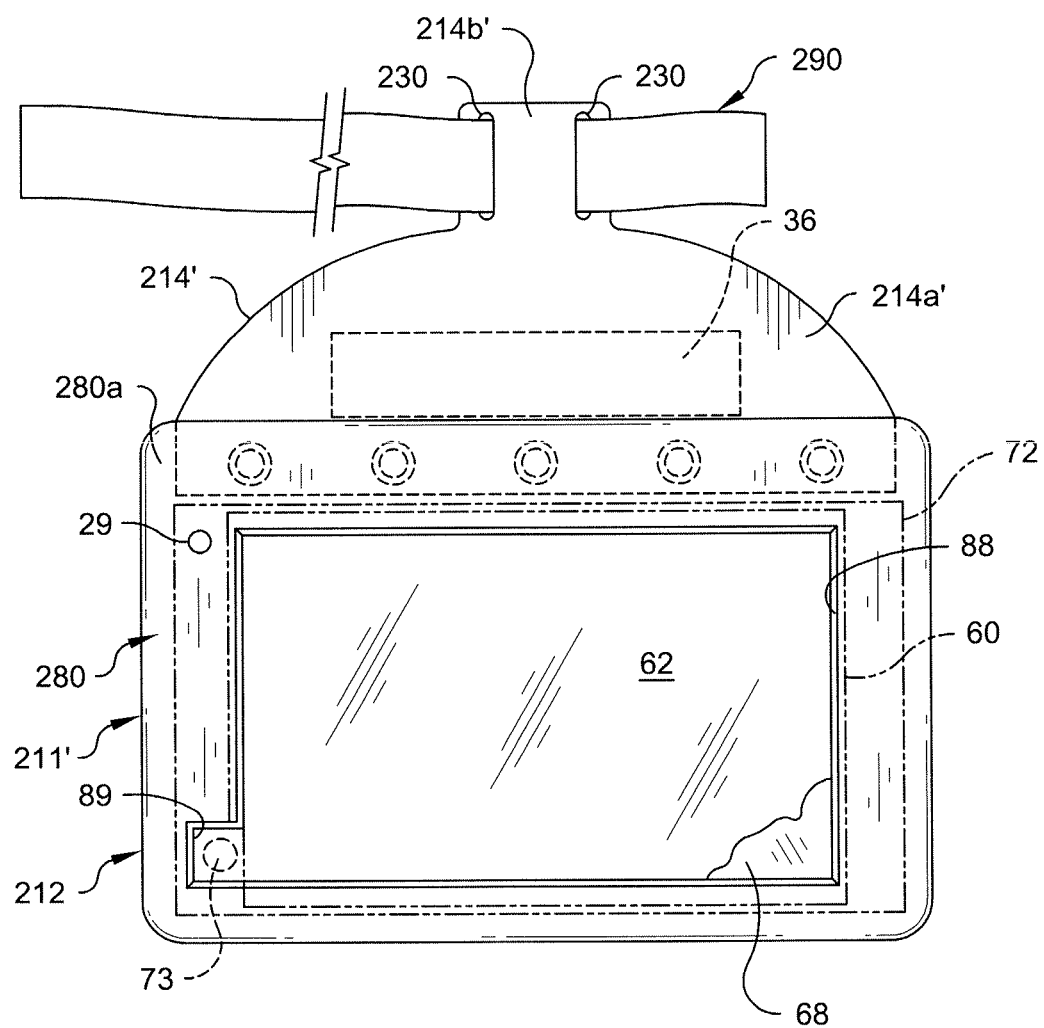
FIG. 14 depicts the second embodiment tag of FIGS. 11-13 with modified second bag attachment.

FIG. 14 represents a slightly modified version of the tag of FIGS. 11-13 and identified as tag 210'. Body 211' has the same first hollow, rigid component 212 with case 280 of tag 280 and identical to that of 80 or 80' of the first or second embodiment tags 10, 10'. The construction of the second component/planar flap 214' remains the same as flap 14 shown in FIG. 4 with the same major portion now 214a' and a tongue 214b', which is integral and coplanar with the main portion 214a'. Tongue 214b' is provided with two closely spaced, closed perimeter through openings 230' through which a flexible connector 290' also in the form of a strip of flexible fabric hook 290b and loop 290a fastener material is passed. Connector 290' can be fixed to the tongue 214b' by adhesive, welding or mechanical connector but need not be. In all other respects, tag 210' is identical to tag 210.

Figure 15:
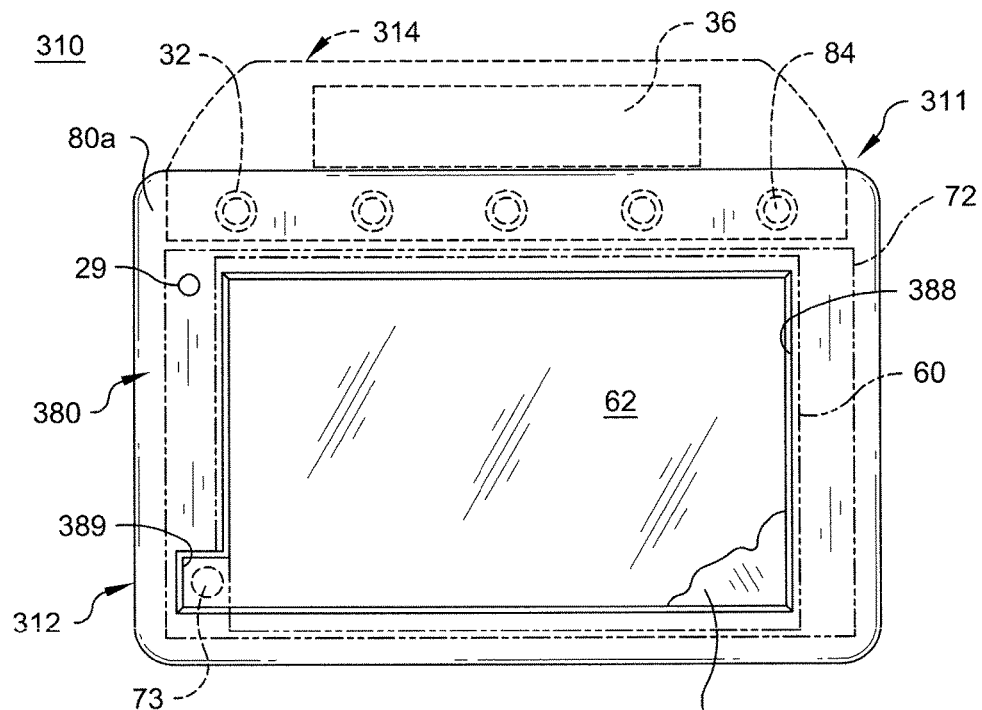
FIGS. 15-16 depict front and rear views of a third embodiment tag with third bag attachment.
Figure 16:
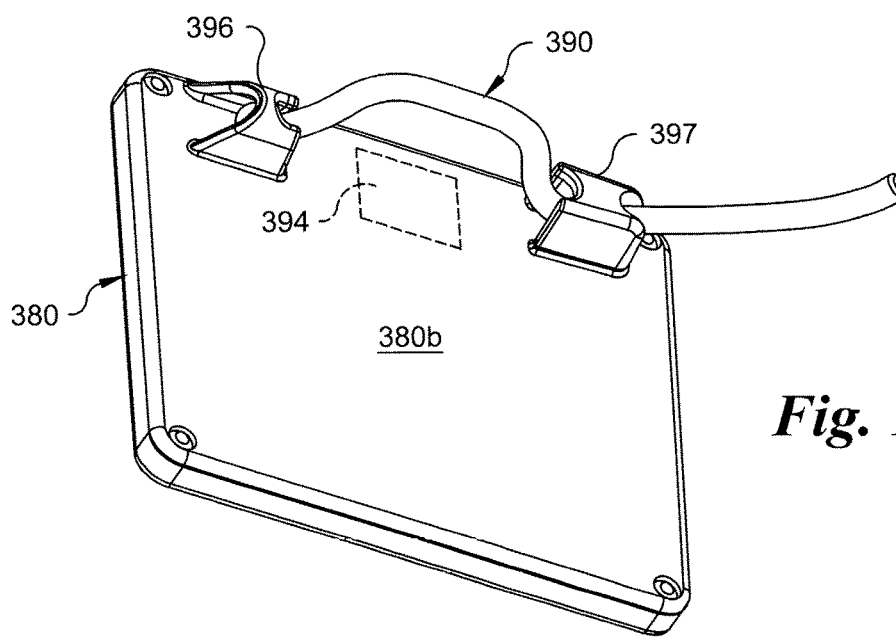

FIGS. 15-16 depict yet a third embodiment, electronic, programmable luggage tag 310 with an alternative bag securement construction. Tag 310 has a body 311 including a first component 312 with "hard" case 380 and optionally, a second component/planar flap 314 indicated generally in phantom. The primary purpose in providing a second component/flap 314 would be to house a radio frequency identification transponder assembly 36 (phantom) encapsulated in the second component/planar flap 314. A secondary purpose would be to provide printing on the tag 310 that is not, for any reason, provided on the case 380. Such printing might include a logo or other trademark identifier information that would be the same from flap to flap of different tags or a unique identifier of the tag like 23 of FIG. 1. The second component/planar flap 314 is still fixedly and permanently secured to the case 380 in any of the ways previously described so as to extend outwardly away from the case 380 in a common plane with the case 380. The construction of the second component/planar flap 314 remains the same as that of flap 14 shown in FIG. 4 although now, for reasons that will become apparent, the mounting holes 30 can be eliminated. Except as being modified for attachment, first component 312 and case 380 remain functionally the same as previous first components and cases and contain the same electrical/electronic components.

Referring to FIG. 16 where optional second component 314 is omitted for clarity, tag 310 may be secured to the handle of a bag (not depicted) with a flexible connector 390 cooperating with a pair of receivers 396, 397 permanently and integrally connected with the exposed outer side of a rear piece 380b of the case 380. Receivers 396, 397 may be formed separately (i.e. molded) and permanently joined to the rear piece 380b by means suitable for the material(s) used, or may be molded integrally with the rear piece 380b if all are of plastic. Flexible connector 390 is again, preferably an elastic shock or "Bungee" cord, that is eventually knotted or provided with a clip (neither depicted) at either end or the ends joined together (not depicted) to prevent the connector 390 from passing through the opening of a proximal receiver 396, 397. Also, an adhesive layer 394 (phantom) may again be provided on the rear surface of case 380 or the optional second component/flap 314 (if provided) to restrict movement of the tag 310 on a bag handle. The receiver or receivers 396, 397 provided on the case 380 can take different physical forms and, without a flap 314, could be provided along the top edge or elsewhere on the case 380.

Figure 17:
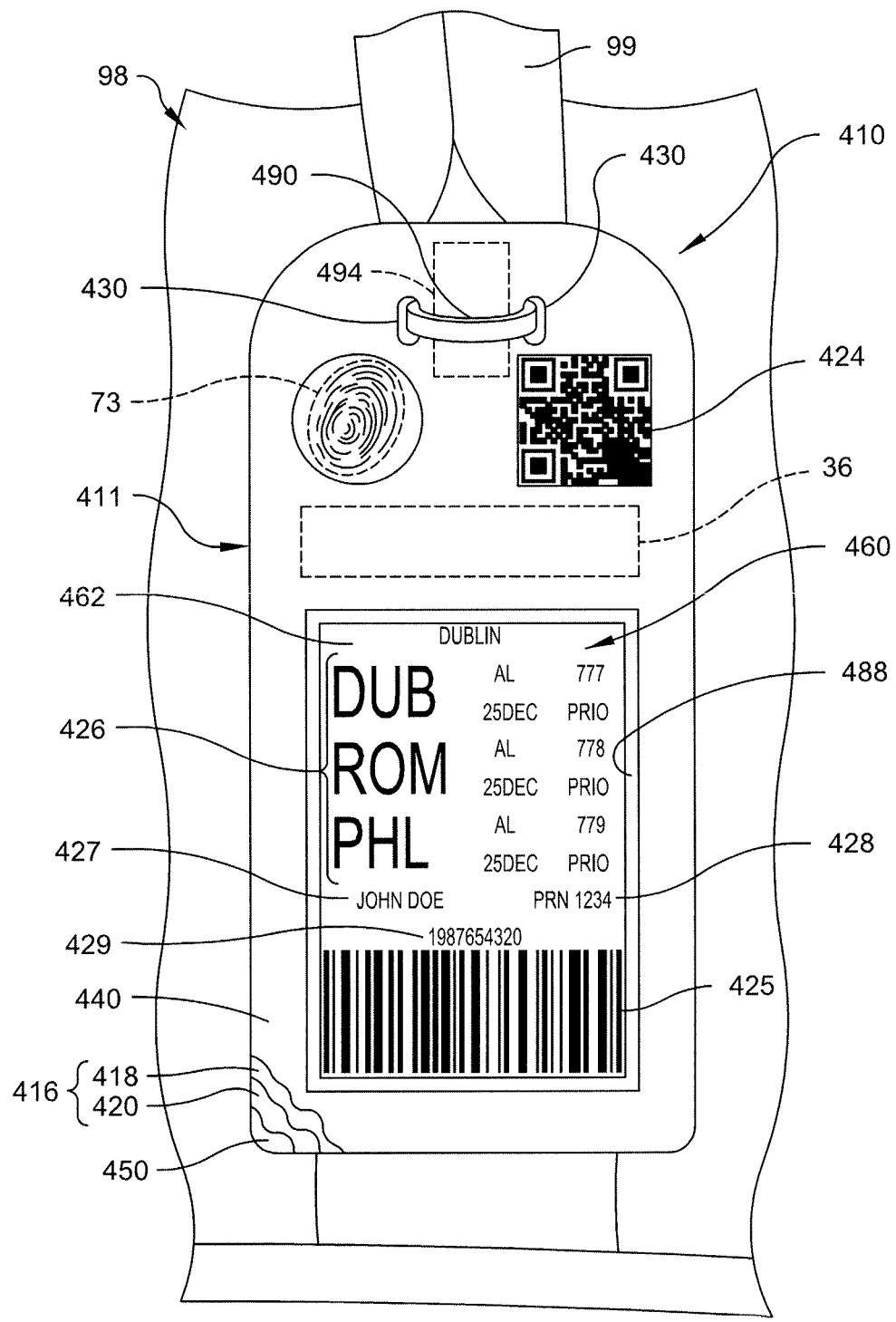
FIG. 17 depicts a fourth embodiment tag of different construction than previous tags.

FIG. 17 depicts a fourth embodiment, smart device programmable electronic luggage tag indicated generally at 410. Tag 410 represents an different physical form to the previously disclosed, first and second component tags 10, 10', 110, 210, but having the same operational components and capabilities. Tag 410 contains the same electrical/electronic components of tags 10, 10', 110, 210 but all of the electrical/electronic components 36, 70, 73, 79 and a flexible display assembly 460 are combined together in a single, resilient flexible body 411. Tag 410 includes a planar, flexible sheet core 416 like 16 but coextensive with the entire tag 410. The core 416 is again formed by at least first and second preferably microporous core strips 418, 420, fixedly and permanently joined together around at least one radio frequency identification (RFID) transponder assembly 36, one programmable electronic visual display assembly 460 and the other circuitry 70. Display assembly 460, unlike previous assembly 60, must be flexible to survive in the absence of a hard case 80, 80', 280, 380. First and second transparent flexible polymer cover strips 440, 450 are integrally and permanently secured to the exposed major front and rear sides of the core 416. The screen 462 of the flexible display 460 is visible beneath the front transparent cover strip 440 through a window 488 cut through front core strip 418. The RFID transponder assembly 36 and the other circuitry 70 including the battery power supply (not separately indicated) are encapsulated in the core 416. The manually operated input device 73 (phantom) may be located within the core 416 but may be located between the core 416 and the front cover strip 440. Device 73 again activates the other circuitry 70 for reprogramming the image produced by the display assembly 460 on the display screen 462.

The tag 410 further includes separate from the display 460 an optional, permanent, two dimensional bar code 424 (e.g. a QR code) as an alternative means to enable a smart device (e.g. a cell phone) with camera to connect with a remote data base (e.g. Airline Reservation System) containing the user's itinerary and other data for down-loading to the smart device and transfer from that device to the tag 410. QR decoding software is commonly provided as an app in camera equipped cell phones and smart devices. Instead of locating an app manually on the smart device display, the user would simply take a picture of the 2-D bar code 424, which would contain coding to automatically connect the user with the remote data base to download display information and other itinerary information to be transmitted to the tag 410 for at least reprogramming the display assembly 460. Such a two dimensional bar code 424 could be provided on any embodiment of the invention.

In this embodiment 410, the display 460 has been configured to generate a single baggage management/handling one dimensional bar code 425 in addition to the itinerary data 426, the user's name 427, a Passenger Reference Number 428 (PRN 1234), and an identification code 429 (1987654320) unique to the tag, which may be the unique identification number of the RFID assembly 36 or its circuit chip assigned by the assembly or chip manufacturer. A wide variety of formats are available and the invention is not limited to formats illustrated.

Two closely spaced, closed perimeter openings 430 are again located at one longitudinal end of the tag most distal to the display 460 and are sized to receive a flexible attachment device 490, in this example, a flexible plastic connector of the type variously referred to as a cable tie or zip tie or hose tie or tie wrap. Connector 490 does not require any other components to secure the tag 410 tightly to the handle 99 of a bag 98 in the so-called license plate position to enable the tag 410 to be read by conventional airline baggage management/handling system optical scanners as the bag travels conveyors. The resilient flexibility of the tag 410 (or any of the prior flaps 14, 214, 214') can maintain the attachment device 490 under tension if secured sufficiently tightly to the handle 99, to increase friction of the tag 410 and attachment device 490 against the handle. If desired, connector 490 can be used with any of the prior embodiments 10, 10' and 210. Again, an adhesive layer 494 (phantom) may be provided on the hidden, second/rear side of the tag 410 to increase the grip of the tag 410 on the handle 99.

While not elastic, such ties 490 are minutely adjustable in their securement owing to their closely spaced engagement teeth and can be drawn sufficiently tightly when installed to remain under tension, particularly with a flexible flap that will bend but provide some resistance to bending. An alternative non-elastic but flexible attachment device that can be tightened down to remain under tension is a so-called hose clamp (not depicted) that includes a tightening screw.

Figure 18:
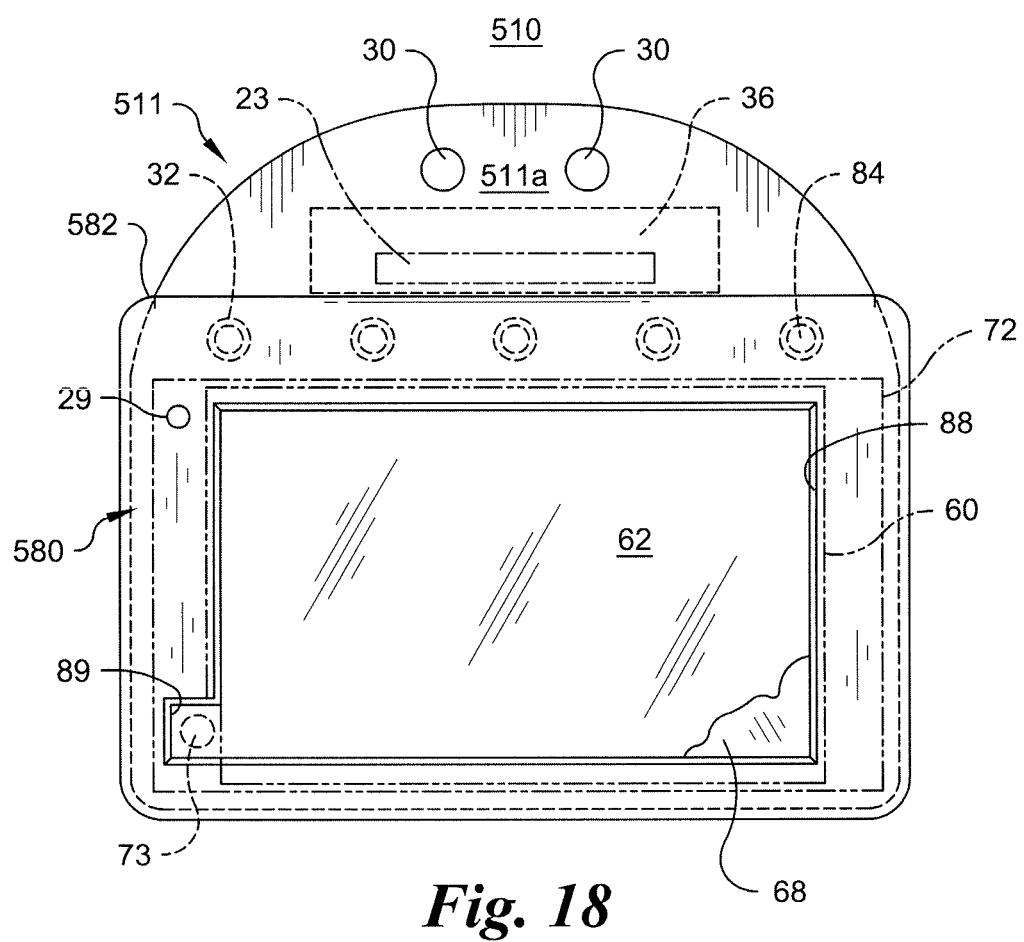
FIG. 18 depicts a fifth embodiment tag of different construction than previous tags.

It should further be appreciated that the invention also includes the provision of all of the electrical/electronic components, i.e. RFID transponder assembly 36, visual display assembly 60, other circuitry 70, input device 73 and battery power supply 79 in one, resiliently flexible polymer laminate body that is itself at least partially contained in a hard case. Referring to FIG. 18, a laminate plastic sheet/film body 511 (like body 11 with layers 18, 20, 40, 50) would contain all of the aforesaid electrical/electronic components with at least display assembly 60 and some or all of the other components 70 on the circuit board 72 in the hard case like 580 with a portion 511a of the body 511 exposed from the case 580 through a slot 582. Window 588 and recess 589 would not have to be sealed as the body 511 itself is hermetically sealed by its laminate construction.

Figure 19:
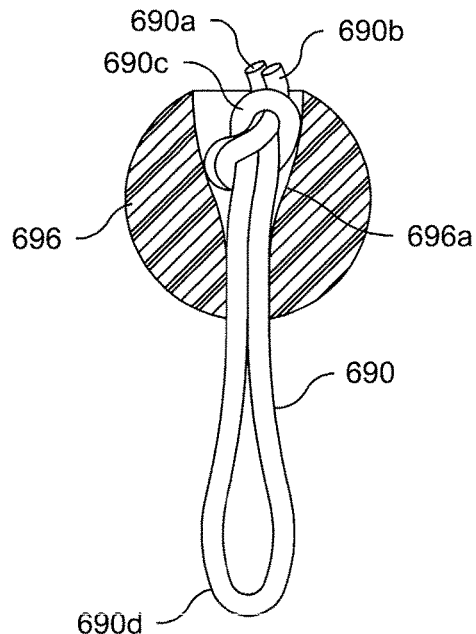
FIGS. 19-20 a fourth bag attachment by itself and with the first embodiment tag.
Figure 20:
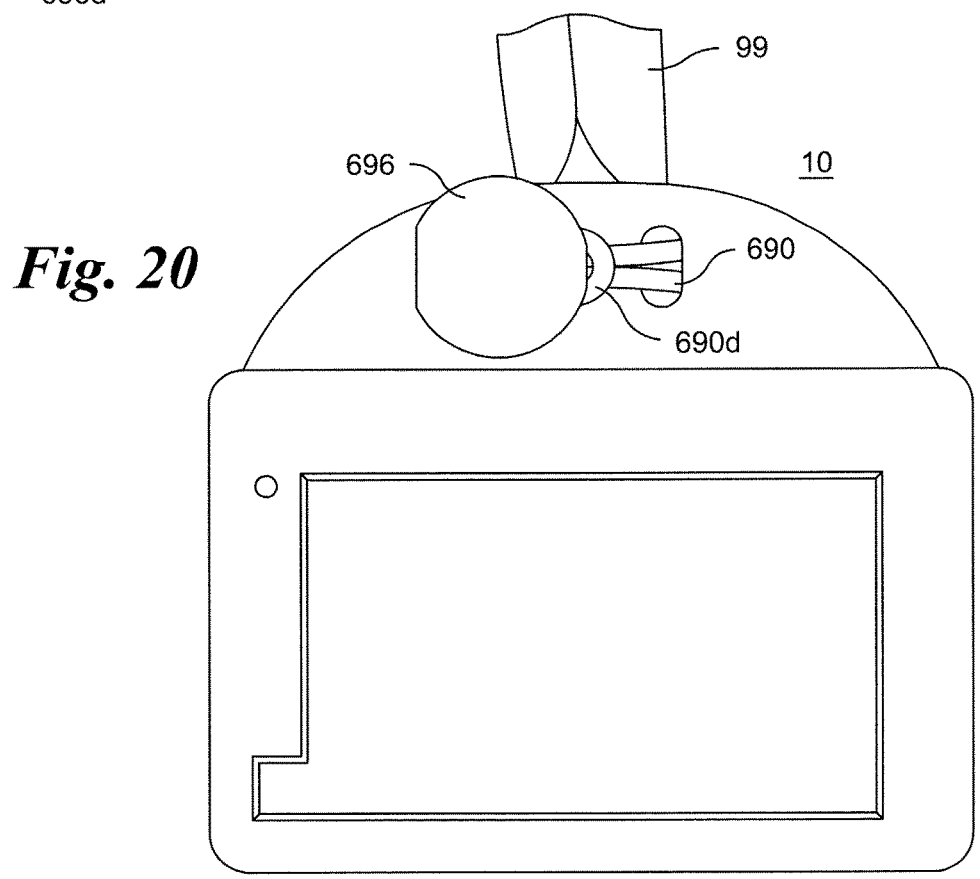

One type of flexible connector receiver 96 shown in FIG. 9 separately receiving and securing the opposing free ends 90a, 90b with one thickness of the elastic flexible connector 90 threaded through the holes 30 and bores 961, 962, 963 of the receiver 96. FIGS. 19-20 show a different type of receiver 696 having a body with a bore 696a (phantom) through which a doubled over portion of an elastic flexible connector (Bungee/shock cord) 690 extends. Free ends 690a. 690b are fixedly joined, for example by being knotted together, to form an enlarged joined end 690c of the connector 690 and a loop or looped end 690d at an opposing end of the doubled over fastener 690. Enlarged end 690c is retained in a diminishing diameter bore 696a (phantom) in receiver 696 allowing looped end 690d to be passed through one closed perimeter through tag opening 30, around a bag handle 99 and through the second tag opening 30 at which time, the looped end 690d is stretch over and around the receiver 696 onto and around the doubled fastener 690 extending from the receiver. The enlarged diameter of the receiver 696 retains the looped end 690d.

It should also be appreciated that although the primary use of the tags 10, 10', 210, 310, 410, 510 of the present invention are with airline passenger bags, the tags of the present invention may be integrated into the systems of other carriers (e.g. bus, ship and rail) and provided for different uses such as event admission tickets.

The invention claimed is:

1. An electronic luggage tag comprising:
   a body having two adjoining through openings spaced less than four centimeters apart and located to permit the tag to be strapped to a handle of a bag through the openings;
   a bistable electronic visual display assembly in the body and including a display screen visible outside the body;
   a radio receiver in the body;
   a processor in the body operably connecting the radio receiver with the display assembly to change an image shown on the display screen in response to external command signals received through the radio receiver;
   a battery power supply in the body;
   a manual input device located on the body for manual actuation and configured to selectively connect the battery power supply with the radio receiver and the processor to activate the radio receiver and the processor to reprogram an image displayed on the display screen in response to external command signals received by the radio receiver; and
   a radio frequency identification transponder assembly in the body operating independently of the display assembly, radio receiver, processor, battery power supply and manual input device.

2. The electronic luggage tag of claim 1 where the radio frequency identification transponder assembly operates at an ultra high frequency (UHF).

3. The electronic luggage tag of claim 2 where the radio frequency identification transponder assembly is passive and powered to operate only by an external interrogation radio signal.

4. The electronic luggage tag of claim 1 in combination with a flexible connector passed through the two openings, the flexible connector being of a length sufficient to secure the tag to a handle of a bag.

5. The electronic luggage tag of claim 1 where the body comprises a hollow rigid case with the bistable electronic visual display assembly, radio receiver, processor, battery power supply and manual input device.

6. The electronic luggage tag of claim 5 where the hollow rigid case is assembled from high impact plastic components.

7. The electronic luggage tag of claim 5 where the hollow rigid case is assembled from metal and plastic components.

8. The electronic luggage tag of claim 5 where the body further comprises a planar, resiliently flexible flap containing the radio frequency identification transponder assembly, the flap being fixedly joined with the hollow, rigid, case.

9. The electronic luggage tag of claim 8 where planar, resiliently flexible flap includes a core formed by two sheets of flexible, material encapsulating the radio frequency identification transponder assembly, at least one of the two sheets being microporous polysilicate with a uniform porosity throughout of greater than thirty percent by volume and an average pore size of about one micron or less.

10. The electronic luggage tag of claim 8 where the case has a given stiffness to force applied to a major side and the flap has a stiffness before connection with the case to force applied to a major planar side of the flap less than the given stiffness of the case.

11. An electronic luggage tag comprising:
    a body
    a bistable electronic visual display assembly in the body and including a display screen visible outside the body;
    a radio receiver in the body;
    a processor in the body operably connecting the radio receiver with the display assembly to change an image shown on the display screen in response to external command signals received through the radio receiver;
    a battery power supply in the body;
    a manual input device located on the body for manual actuation and configured to selectively connect the battery power supply with the radio receiver and the processor to activate the radio receiver and the processor to reprogram an image displayed on the display screen in response to external command signals received by the radio receiver; and a flexible connector attached to the tag, the flexible connector being of a length sufficient to secure the tag to a handle of a bag.

12. The electronic luggage tag of claim 11 where the flexible connector is elastic.

13. The electronic luggage tag of claim 11 further comprising a receiver capturing and retaining free ends of the flexible connector to secure the connector with a bag handle.

14. The electronic luggage tag of claim of claim 11 where the elastic flexible connector is a length of fabric with hook and loop fasteners.

* * * * *